（12) United States Patent
Yang

(10) Patent No.: US 8,811,474 B2
(45) Date of Patent: Aug. 19, 2014

(54) ENCODER AND ENCODING METHOD USING CODED BLOCK PATTERN ESTIMATION

(75) Inventor: Geun-Hee Yang, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 455 days.

(21) Appl. No.: 13/193,066

(22) Filed: Jul. 28, 2011

(65) Prior Publication Data

US 2012/0027080 A1 Feb. 2, 2012

(30) Foreign Application Priority Data

Jul. 29, 2010 (KR) ........................ 10-2010-0073705

(51) Int. Cl.
*H04N 7/32* (2006.01)
(52) U.S. Cl.
USPC .................................................... 375/240.03
(58) Field of Classification Search
CPC . H04N 7/32; H04N 7/26872; H04N 7/26037; H04N 7/26026
USPC .................................................... 375/240.03
See application file for complete search history.

(56) References Cited

U.S. PATENT DOCUMENTS

| | | | |
|---|---|---|---|
| 8,559,519 B2 * | 10/2013 | Shi et al. .................. | 375/240.16 |
| 2007/0104268 A1 * | 5/2007 | Seok et al. ................. | 375/240.2 |

FOREIGN PATENT DOCUMENTS

| | | |
|---|---|---|
| JP | 2003-324731 | 11/2003 |
| KR | 1020070050335 | 5/2007 |
| KR | 1020090122633 | 12/2009 |

OTHER PUBLICATIONS

A Fast Inter Mode Decision Algorithm in H.264/AVC for IPTV Broadcasting Services, Kim et al., Visual Communications and Image Processing 2007, Proc. of SPIE-IS&T Electronic Imaging, SPIE vol. 6508.*
Geun-Yong Kim and Yo-Sung Ho, A Fast Inter Mode Decision Algorithm Considering Quantization Parameter in H.264, Gwangju Institute of Science and Technology Department of Information and Communications, pp. 11-19.

* cited by examiner

*Primary Examiner* — Jay Patel
*Assistant Examiner* — Francis G Geroleo
(74) *Attorney, Agent, or Firm* — F. Chau & Associates, LLC

(57) ABSTRACT

An encoder includes a motion estimation module configured to perform motion estimation of a current frame based on at least one reference frame, a motion compensation module configured to generate a signal including a compensation image for the current frame from the at least one reference frame using a result of the motion estimation performed by the motion estimation module, and a coded block pattern (CBP) estimation module configured to estimate a CBP based on the signal output from the motion compensation module.

17 Claims, 16 Drawing Sheets

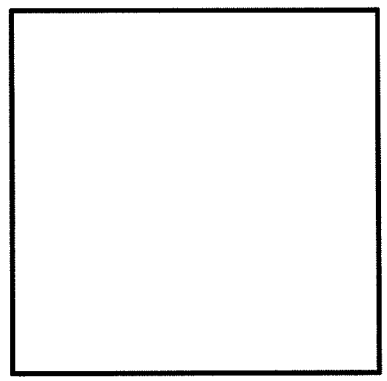
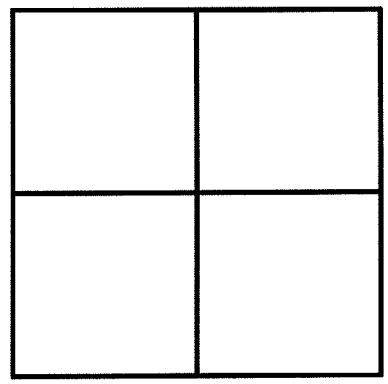
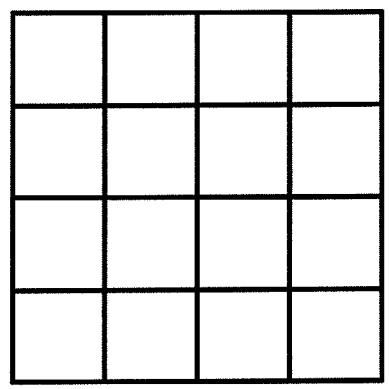
FIG. 4

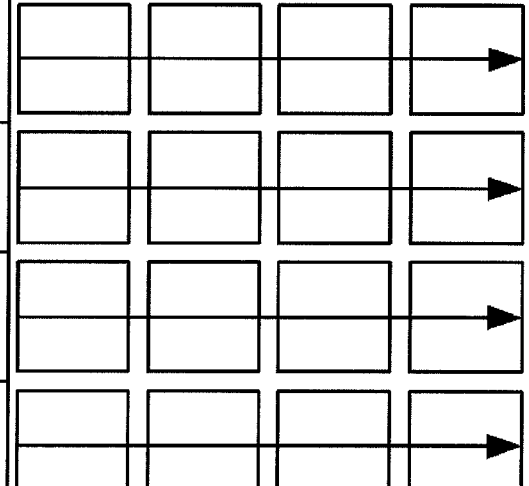

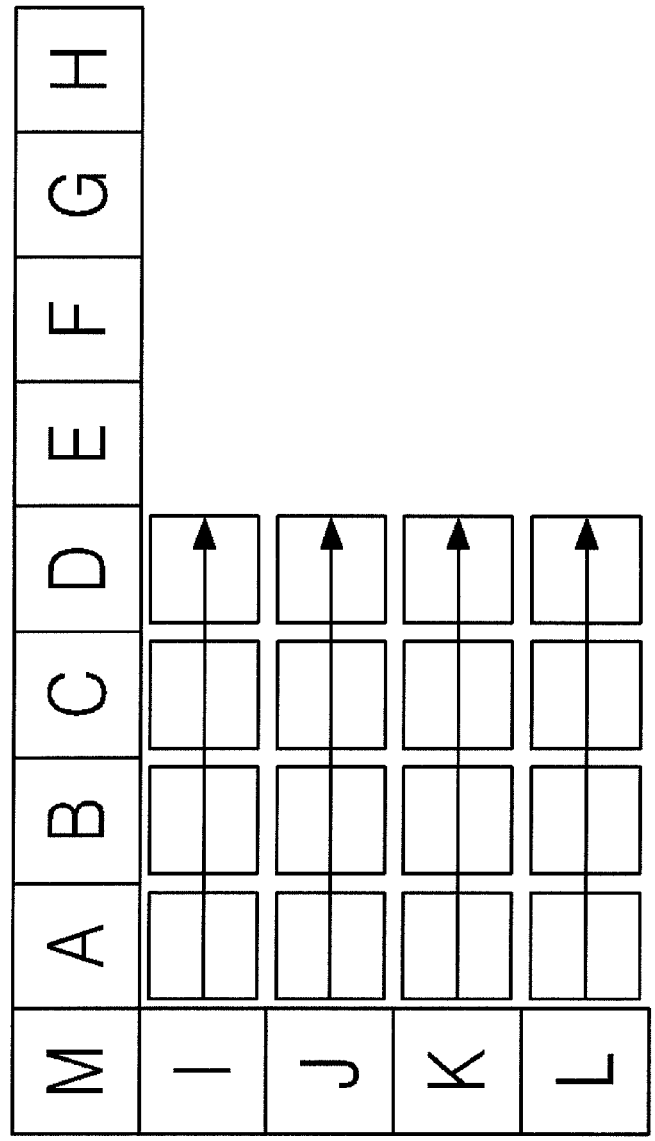

Mean

FIG. 5F 5 (vertical-right)

FIG. 5H 7 (vertical-left)

ENCODER AND ENCODING METHOD USING CODED BLOCK PATTERN ESTIMATION

CROSS-REFERENCE TO RELATED APPLICATIONS

This application claims priority under 35 U.S.C. §119(a) from Korean Patent Application No. 10-2010-0073705 filed on Jul. 29, 2010, the disclosure of which is incorporated by reference in its entirety herein.

BACKGROUND

1. Technical Field

Embodiments of the present inventive concept relate to a video encoder and encoding method, and more particularly, to an encoder using coded block pattern (CBP) estimation.

2. Discussion of Related Art

Encoders do not use data from neighboring macroblocks when determining an encoding mode due to a pipeline structure but determine the mode after calculating a cost through estimation using input video data. During high bit rate encoding, the encoders show satisfactory performance when they determine the mode after calculating the cost since there is not much difference between the data of the neighboring macroblock and the input video data. However, during low bit rate encoding, such as in digital multimedia broadcasting (DMB) or video conversation, the difference between the data of the neighboring macroblock and the input video data increases, and therefore, the performance of mode determination decreases.

SUMMARY

According to an exemplary embodiment of the present inventive concept, an encoder includes a motion estimation module configured to perform motion estimation of a current frame based on at least one reference frame, a motion compensation module configured to generate a signal including a compensation image for the current frame from the at least one reference frame using a result of the motion estimation performed by the motion estimation module, and a CBP estimation module configured to estimate a CBP based on the signal output from the motion compensation module.

The signal output from the motion compensation module may include a motion vector value and a motion vector estimation value.

According to an exemplary embodiment of the present inventive concept, an encoding method includes performing motion estimation of a current frame based on at least one reference frame, generating a signal including a compensation image for the current frame from the at least one reference frame using a result of the motion estimation, and estimating a CBP based on the signal.

According to an exemplary embodiment of the inventive concept, a method of encoding data includes performing motion estimation on a current frame of image data using a reference frame of image data to generate motion estimation data, generating a compensation image from the motion estimation data and the reference of image data, estimating code block pattern value from the compensation image, determining coding mode to be inter-frame coding when the value is 0 or intra-framing coding otherwise, and encoding the current frame of image data using the determined coding mode.

BRIEF DESCRIPTION OF THE DRAWINGS

The present inventive concept will become more apparent by describing in detail exemplary embodiments thereof with reference to the attached drawings in which:

FIG. 4 is a diagram for explaining an intra mode of H.264;

FIGS. 5A through 5I show examples of an intra prediction mode;

DETAILED DESCRIPTION

Figure 1:
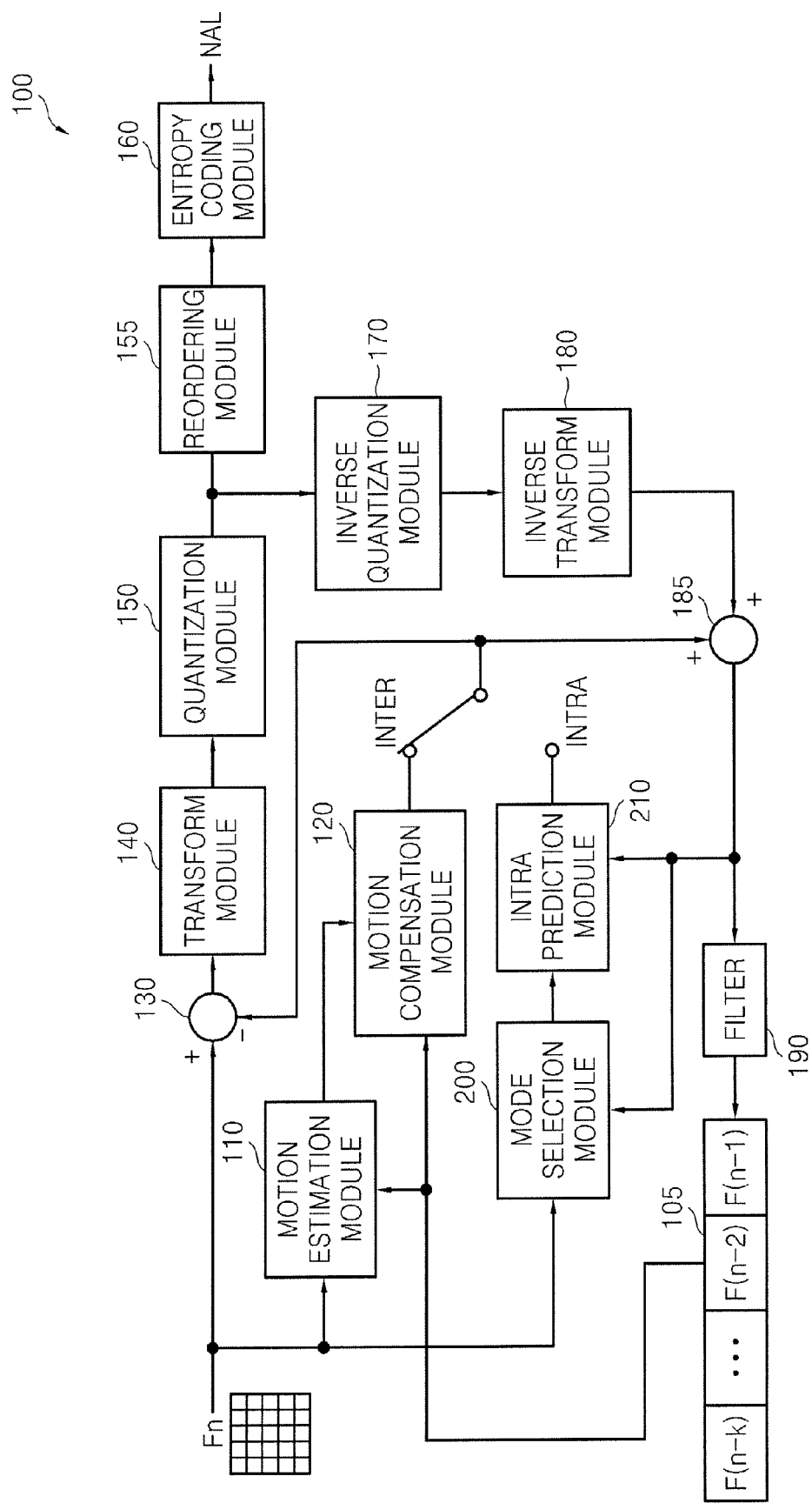
FIG. 1 is a block diagram of an H.264/advanced video coding (AVC) encoder.

The present inventive concept now will be described more fully hereinafter with reference to the accompanying drawings, in which exemplary embodiments of the inventive concept are shown. The inventive concept may, however, be embodied in many different forms and should not be construed as limited to the embodiments set forth herein. In the drawings, the size and relative sizes of layers and regions may be exaggerated for clarity. Like numbers refer to like elements throughout. It will be understood that when an element is referred to as being "connected" or "coupled" to another element, it can be directly connected or coupled to the other element or intervening elements may be present.

FIG. 1 is a block diagram of an H.264/advanced video coding (AVC) encoder 100. H.264 is a standard for video compression and may be used for recording, compressing, and distributing high definition video. H.264/AVC video coding may include intra coding (e.g., intra-frame coding), which uses spatial similarity between blocks in a frame and inter coding (e.g., inter-frame coding), which uses a similarity between video frames having a temporal difference.

In intra coding, lossless and lossy compression techniques are performed relative to information that is contained only within the current frame and not relative to any other frame in the video sequence. In other words, temporal processing is not performed outside of the current picture or frame.

In inter coding; an inter-frame is a frame in a video compression stream, which is expressed in terms of one or more neighboring frames. Inter coding uses inter-frame prediction to take advantage of temporal redundancy between neighboring frames, which may achieve higher compression rates.

Referring to FIG. 1, the encoder 100 is configured to encode a video signal in the intra mode or the inter mode. The encoder 100 includes a frame storage module 105, a motion estimation module 110, a motion compensation module 120, a differential module 130, a transform module 140, a quantization module 150, a reordering module 155, an entropy coding module 160, an inverse quantization module 170, an inverse transform module 180, an adder 185, a filter 190, a mode selection module 200, and an intra prediction module 210.

Figure 2:
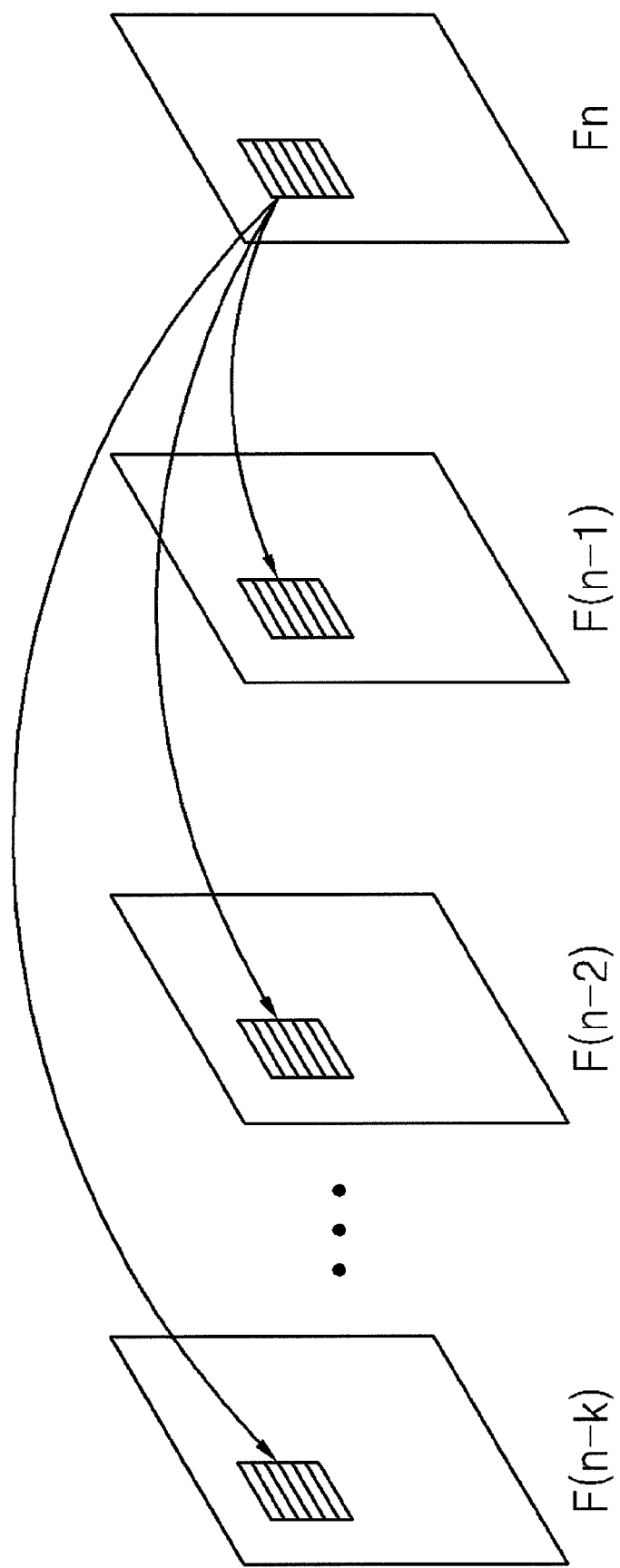
FIG. 2 is a diagram of reference frames.

In the inter mode, the motion estimation module 110 performs motion estimation of a current frame Fn using reference frames F(n-1), F(n-2), ..., and F(n-k) stored in the frame storage module 105. The motion estimation module 110 may use a single reference frame or a plurality of reference frames. FIG. 2 shows the reference frames F(n-1) through F(n-k). Referring to FIG. 2, the motion estimation module 110 may perform the motion estimation of the current frame Fn using at least one among the reference frames F(n-1) through F(n-k). The motion estimation may include finding a motion vector of a plurality of blocks and finding an optimal macro block type having the least bit rate and error with respect to the blocks.

The H.264/AVC standard can divide an image into regions called slice groups, where a slice is a sequence of macroblocks that belongs to the same slice group. Flexible Macroblock Ordering (FMO) decides to which slice each macroblock of the image belongs. Each macroblock can be assigned freely to a slice group using a MacroBlock Allocation map MBAmap. The MBAmap includes an identification number for each macroblock of the image that specifies to which slice group that macroblock belongs. When using FMO, the image can be divided into different scan patterns (types) of the macroblocks. There may be seven FMO map types, referred to as Type 0 through Type 6. In at least one embodiment of the inventive concept, the optimal macro block type is chosen to be one of the FMO types. Type 6 is the most general one and allows full flexibility to the user. The other types use specific pattern rules. Type 1 uses run lengths, which are applied consecutively until the map is complete, where the run lengths are used to rebuild the image on the decoder side. Type 1 uses a mathematical function, which is known in both the encoder and the decoder, to spread the macroblocks. Type 2 organizes the slice groups into regions of regions of interest (ROI) so only the coordinates of ROIs need be saved in the MBAmap (e.g., top left and bottom right corner of a rectangle). Types 3-5 are dynamic types that let the slice groups grow and shrink in a cyclic way, where the growth rate, direction and position in the cycle are parameters.

The motion compensation module 120 may generate a compensation image for the current frame from the reference frames based on the motion vector and the macro block type, which are generated as a result of the motion estimation performed by the motion estimation module 110. The differential module 130 generates and outputs a differential signal based on the current frame and the compensation image output from the motion compensation module 120. The differential signal output from the differential module 130 is subject to a discrete cosine transform (DCT) by the transform module 140 and quantization by the quantization module 150. The reordering module 155 receives a signal from the quantization module 150 and performs a zigzag scan on the signal for variable length coding (VLC) or context-adaptive binary arithmetic coding (CABAC). In coding theory a VLC is a code that maps source symbols to a variable number of bits. VLC codes allow source images to be compressed and decompressed with zero error (lossless data compression) and read back symbol by symbol. CABAC is a form of entropy coding used in H.264 video encoding, which is a lossless compression technique.

The entropy coding module 160 encodes a signal output from the reordering module 155 and outputs a coded bit stream NAL. The signal output from the quantization module 150 is restored through inverse quantization by the inverse quantization module 170 and inverse DCT by the inverse transform module 180. The restored frame image may be stored in the frame storage module 105 via the adder 185 and the filter 190. Inverse quantization allows an image to be displayed with a limited set of colors that associate each color with its nearest representative. The image is represented in compressed form by mathematical components (e.g., DCT coefficients). The process determines the class and quantization number of the quantized DCT coefficient block received.

When the operation mode of the encoder 100 is converted into the intra mode by the mode selection module 200, the intra prediction module 210 performs intra prediction with respect to a macroblock based on adjacent blocks and obtains a compensated frame using the intra-prediction result.

Figure 3:
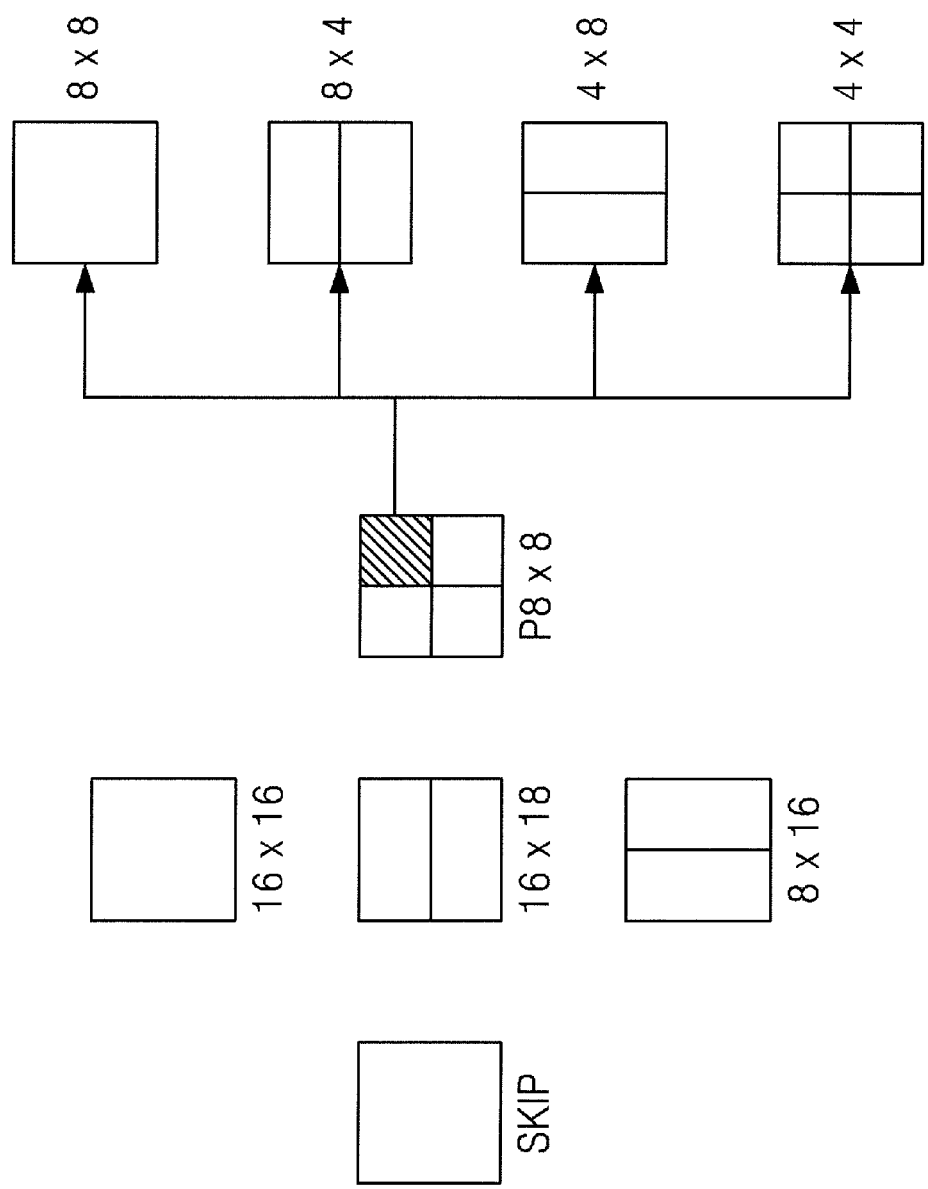
FIG. 3 is a diagram for explaining an inter mode of H.264.

FIGS. 3 and 4 are diagrams for explaining an inter mode and an intra mode according to an exemplary embodiment of the present inventive concept. FIG. 3 is a diagram for explaining the inter mode of H.264. Referring to FIG. 3, H.264 supports five inter modes (e.g., SKIP, 16×16, 16×8, 8×16, and P8×8) used for macroblock coding using motion estimation. The P8×8 mode may be 8×8, 8×4, 4×8, or 4×4.

FIG. 4 is a diagram for explaining the intra mode of H.264. Referring to FIG. 4, H.264 supports three intra modes (e.g., Intra4×4, Intra8×8, and Intra 16×16 for intra mode prediction). In the intra mode, a current macroblock is predicted using boundary pixels of a valid neighboring macroblock that has been coded before.

In the Intra4×4 mode and the Intra8×8 mode for a luminance block, prediction is performed on a 4×4 block and an 8×8 block, respectively, in a total of 9 directions. In the Intra16×16 mode, prediction is performed on a 16×16 block in a total of 4 directions.

FIGS. 5A through 5I show examples of an intra prediction mode. A macroblock to be encoded is divided into at least one sub block. The encoder 100 calculates a difference between a pixel value of each sub block and a pixel value of reference pixels, generates a differential image, and encodes the differential image. When the value of the differential image is small, relatively many bits can be allocated to a small range of data, so that the image can be more accurately encoded and distortion is decreased.

The position of an optimal reference pixel may vary with the characteristics of an image included in each sub block. Accordingly, the encoder 100 may select the position of the optimal reference pixel according to the characteristics of the image included in the sub block and select for the sub block a mode from among the 9 prediction modes illustrated in FIGS. 5A through 5I based on the position of the optimal reference pixel.

Figure 5C:
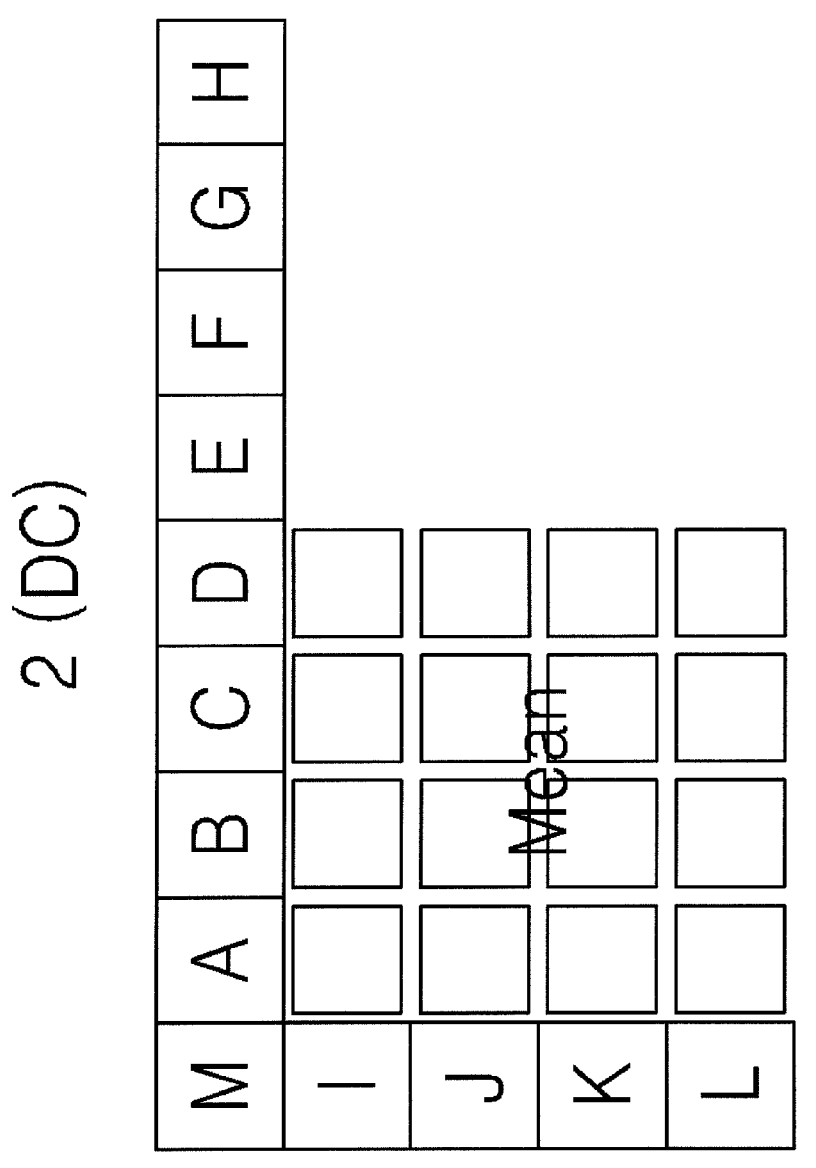
Figure 5D:
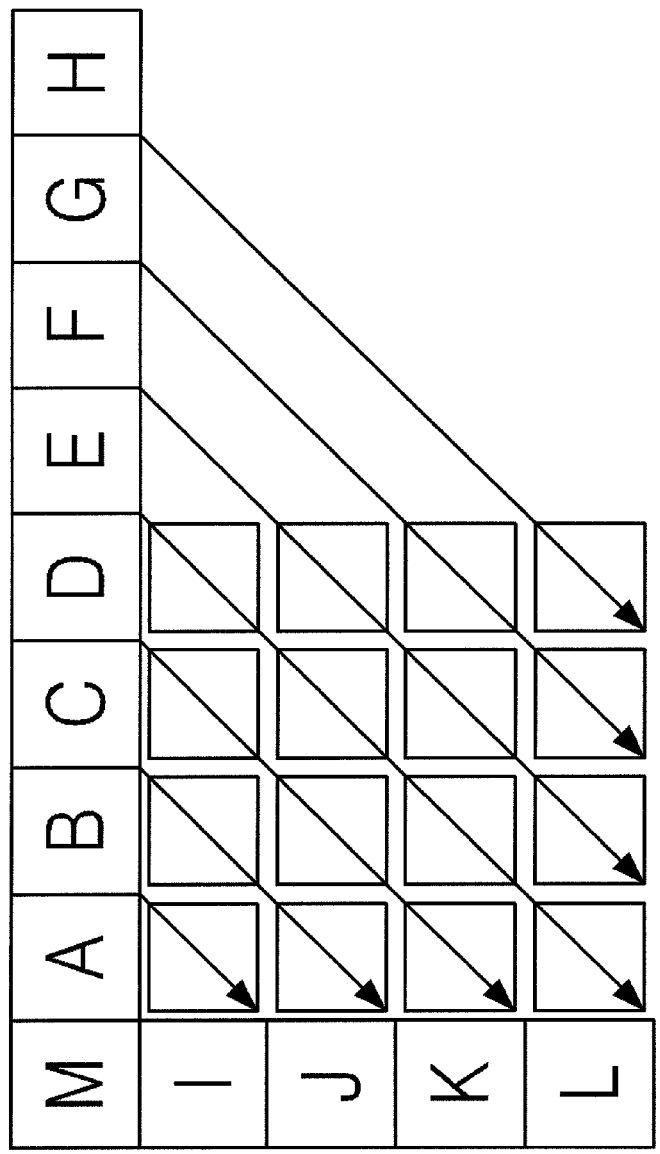
Figure 5E:
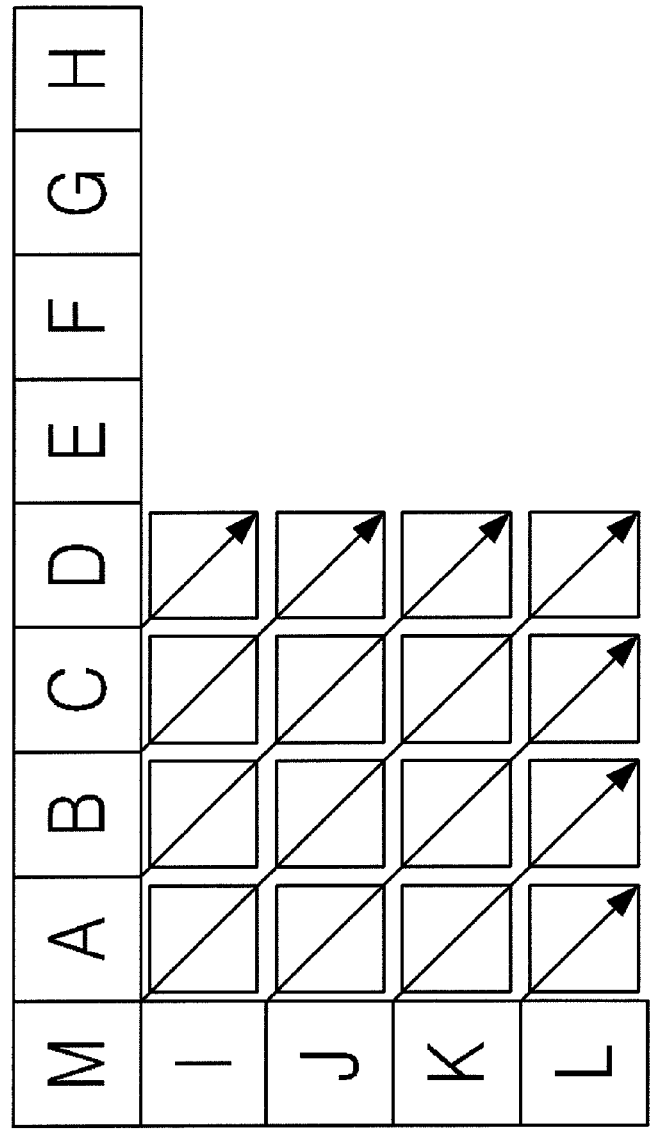
Figure 5F:
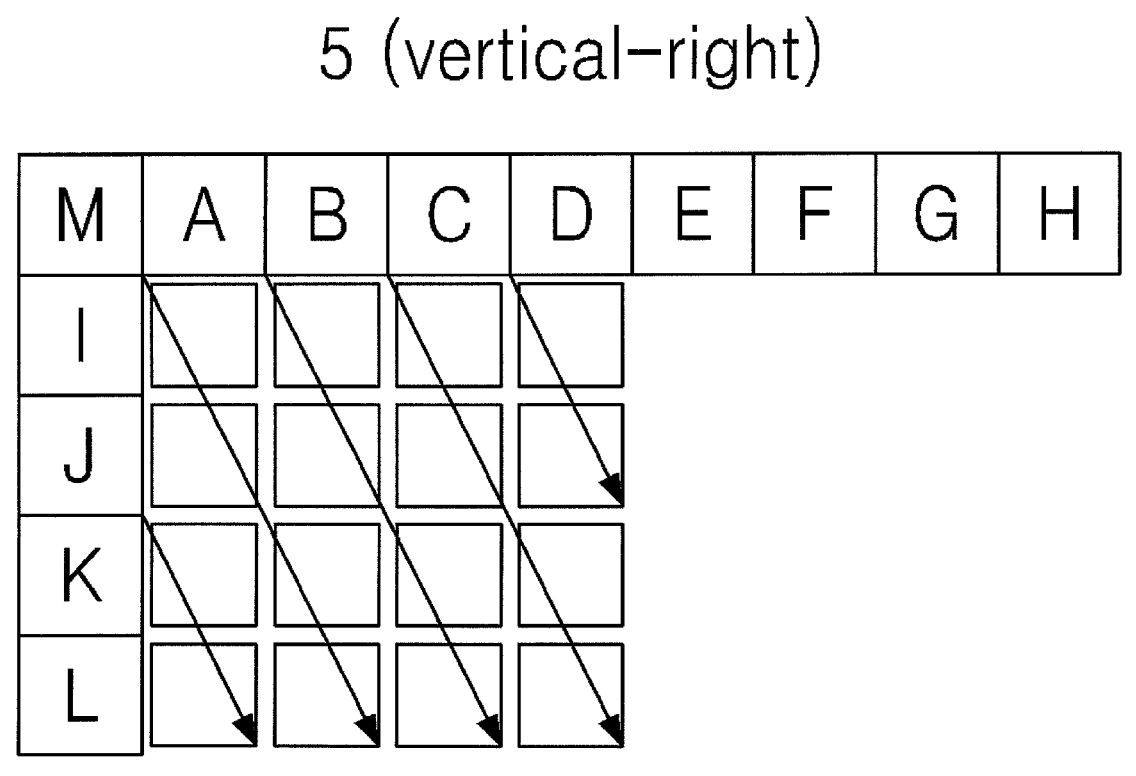
Figure 5G:
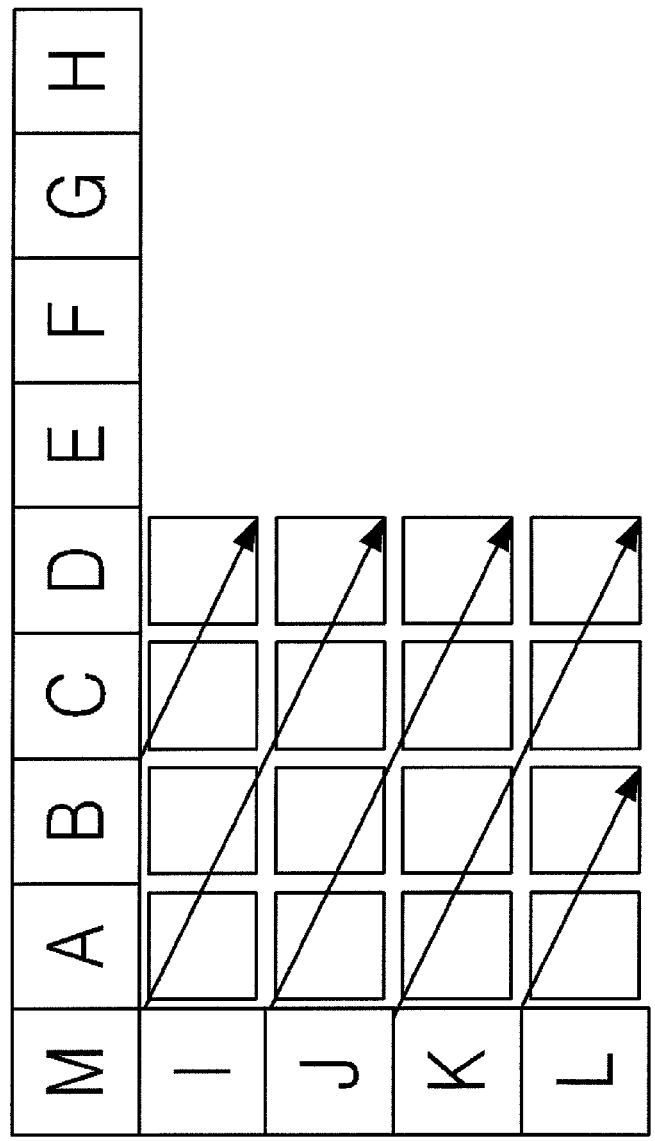
Figure 5H:
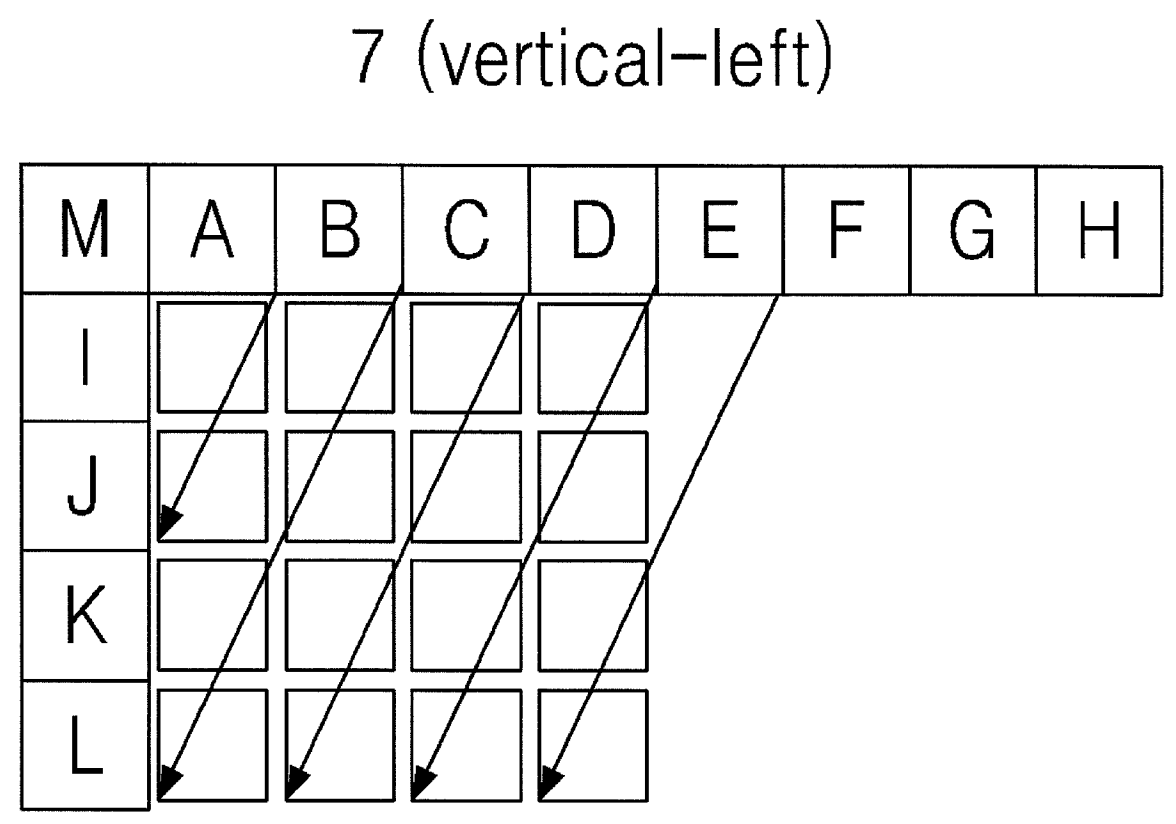
Figure 5I:
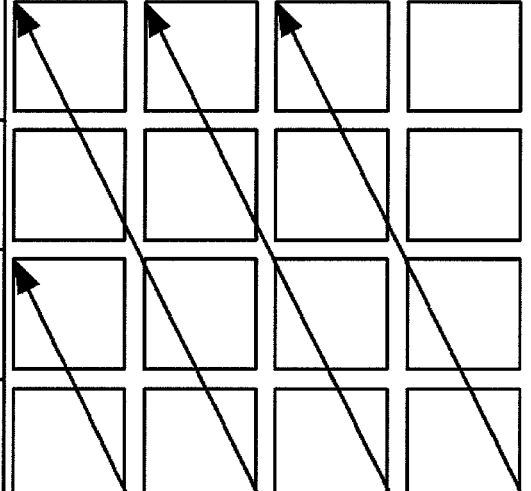

In FIGS. 5A through 5I, pixels in one arrow line are coded with reference to a pixel value of one reference pixel. For example, pixels in the first column of the 4×4 sub block illustrated in FIG. 5A are all coded with reference to a reference pixel A. In addition, pixels in the first row of the 4×4 sub block illustrated in FIG. 5B are all coded with reference to a reference pixel I. Among the inter mode and the intra modes illustrated in FIGS. 3, 4, and 5A through 5I, a mode having the least rate-distortion cost is chosen as a final macroblock mode.

In the SKIP mode, the motion vector and the pattern information of a current macroblock to be encoded are skipped, but a motion vector estimated from a macroblock adjacent the current macroblock is encoded. The SKIP mode can be used only when a coded block pattern (CBP) value is 0 and thus there is no data to predict. According to at least one embodiment of the present inventive concept, the SKIP mode is used to increase the mode decision performance of the encoder 100 illustrated in FIG. 1.

Figure 6:
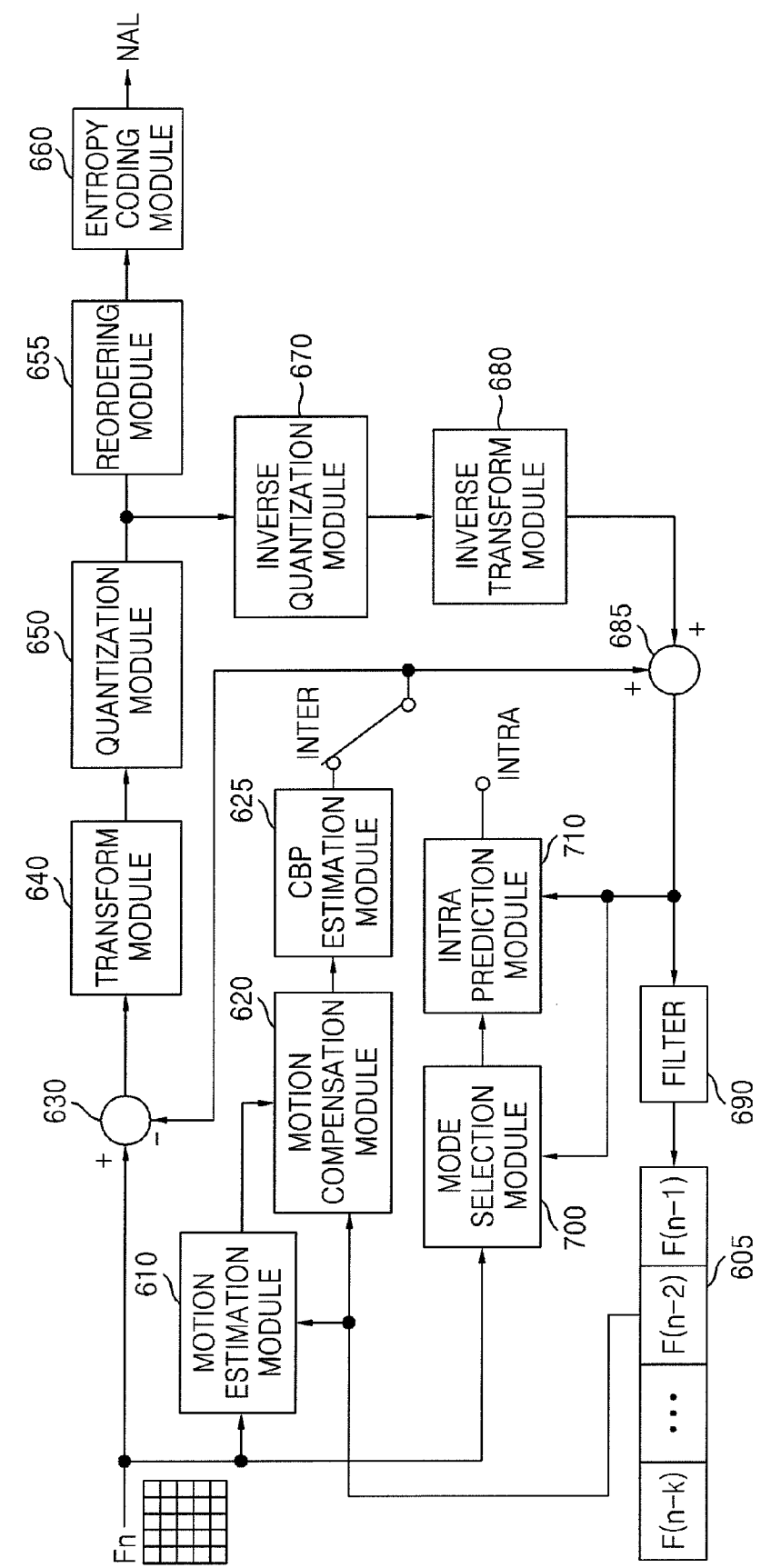
FIG. 6 is a block diagram of an H.264/AVC encoder according to an exemplary embodiment of the present inventive concept.

FIG. 6 is a block diagram of an H.264/AVC encoder 600 according to an exemplary embodiment of the present inventive concept. Referring to FIG. 6, the encoder 600 includes a frame storage module 605, a motion estimation module 610, a motion compensation module 620, a CBP estimation module 625, a differential module 630, a transform module 640, a quantization module 650, a reordering module 655, an entropy coding module 660, an inverse quantization module 670, an inverse transform module 680, an adder 685, a filter 690, a mode selection module 700, and an intra prediction module 710.

In inter mode, the motion estimation module 610 performs motion estimation of a current frame Fn using reference frames F(n-1), F(n-2), . . . , and F(n-k) stored in the frame storage module 605. The motion estimation module 610 may use a single reference frame or a plurality of reference frames. The motion estimation may include finding a motion vector of a plurality of blocks and finding an optimal macro block type having the least bit rate and error with respect to the blocks.

The motion compensation module 620 may generate a compensation image for the current frame from the reference frames based on the motion vector and the macro block type, which are generated as a result of the motion estimation performed by the motion estimation module 610.

The CBP estimation module 625 may estimate a CBP based on the compensation image output from the motion compensation module 620. The CBP estimation module 625 may perform the CBP estimation using a Hadamard transform and quantization. A Hadamard transform is an example of a generalized class of Fourier transforms. The CBP estimation module 625 will be described in detail with reference to FIG. 7 below.

The differential module 630 generates and outputs a differential signal based on the current frame and an image output from the CBP estimation module 625. The differential signal output from the differential module 630 is subjected to a Hadamard transform by the transform module 640 and quantization by the quantization module 650.

The reordering module 655 receives a signal from the quantization module 650 and performs a zigzag scan on the signal for VLC or CABAC. The entropy coding module 660 encodes a signal output from the reordering module 655 and outputs a coded bit stream NAL.

The signal output from the quantization module 650 is restored through inverse quantization by the inverse quantization module 670 and inverse DCT by the inverse transform module 680. The restored frame image may be stored in the frame storage module 605 via the adder 685 and the filter 690.

When the operation mode of the encoder 600 is converted into the intra mode by the mode selection module 700, the intra prediction module 710 performs intra prediction with respect to a macroblock based on adjacent blocks and obtains a compensated frame using the intra-prediction result.

Figure 7:
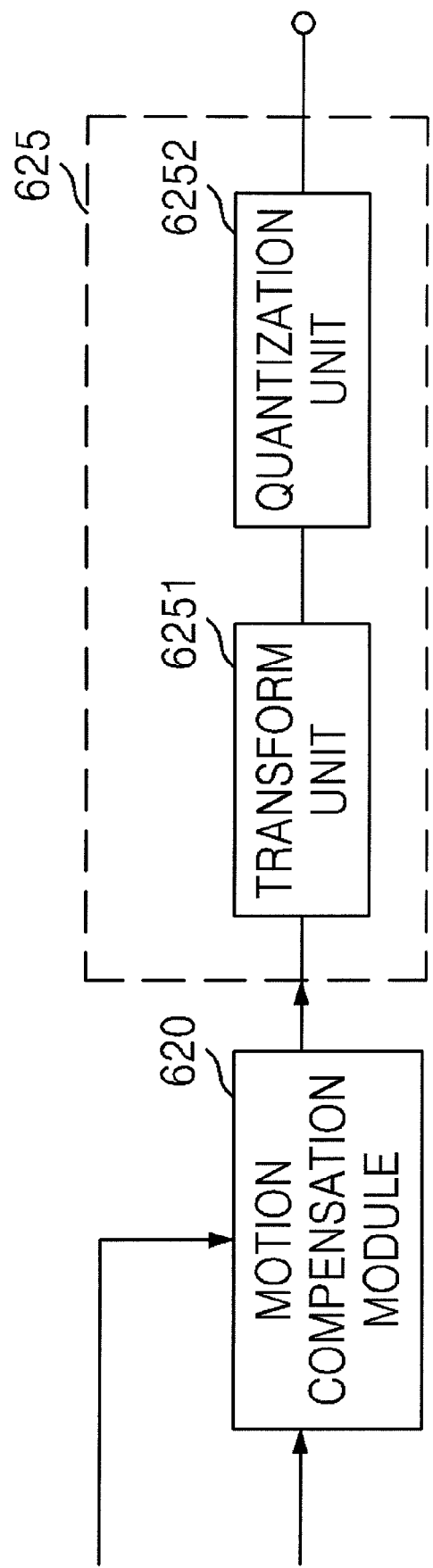
FIG. 7 is a block diagram of a coded block pattern (CBP) estimation module illustrated in FIG. 6 according to an exemplary embodiment of the inventive concept.

FIG. 7 is a block diagram of the CBP estimation module 625 illustrated in FIG. 6. Referring to FIG. 7, the CBP estimation module 625 includes a transform unit 6251 and a quantization unit 6252

The CBP estimation module 625 estimates a CBP based on a signal output from the motion compensation module 620. The CBP estimation module 625 may estimate the CBP using a difference between a motion vector value and a motion vector estimation value. In at least one embodiment of the inventive concept, the motion vector value is from a current macroblock and the motion vector estimation value is a motion vector value estimated from a macroblock adjacent the current macroblock. The CBP estimation module 625 may transform the difference between the motion vector value and the motion vector estimation value using the transform unit 6251 and quantize a transformed difference using the quantization unit 6252. When the result of the quantization is "0", the CBP estimation module 625 recognizes a CBP value as 0 and determines the operation mode to be an inter mode. The transform unit 6251 may transform the difference between the motion vector value and the motion vector estimation value using a Hadamard transform.

Figure 8:
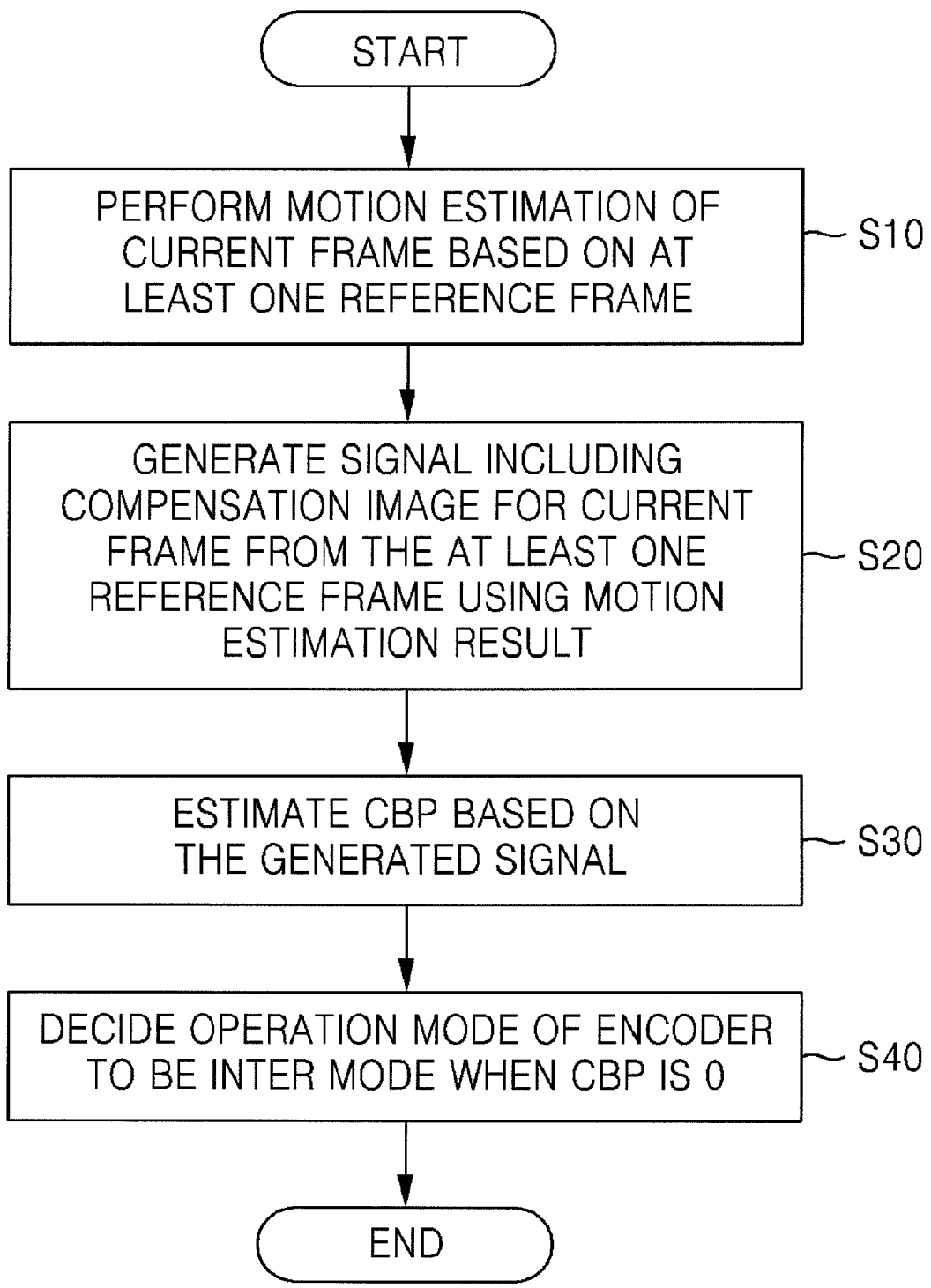
FIG. 8 is a flowchart of an encoding method using CBP estimation according to an exemplary embodiment of the present inventive concept.

FIG. 8 is a flowchart of an encoding method using CBP estimation according to an exemplary embodiment of the present inventive concept. The encoding method may be performed by the encoder 600 illustrated in FIG. 7.

Referring to FIG. 8, motion estimation of a current frame is performed using at least one reference frame in operation S10. A signal including a compensation image for the current frame is generated from the at least one reference frame using a result of the motion estimation of the current frame in operation S20. CBP estimation is performed based on the signal in operation S30. A CBP may be estimated using a difference between a motion vector value and a motion vector estimation value. The difference between the motion vector value and the motion vector estimation value may be transformed using a Hadamard transform and then quantized. When a result of the quantization is 0, the CBP is considered 0.

When the CBP is estimated at 0, the operation mode of an encoder is determined to be an inter mode in operation S40. Thereafter, the encoding method may also include generating a differential signal based on the current frame and an image output in operation S30, performing a Hadamard transform on the differential signal, and performing quantization on a Hadamard-transformed signal. In addition, the encoding method may include performing a zigzag scan on a quantized signal and encoding a scanned signal to output a coded bit stream.

An encoder according to at least one embodiment of the present inventive concept may be included in a media chip and thus embedded in a mobile phone, an MP3 player, a personal digital assistant (PDA), etc.

Some embodiments of the present inventive concept can be embodied in hardware, software, firmware or combination thereof. When the encoding method according to some embodiments of the present inventive concept is embodied in software, it can be embodied as computer readable codes or programs on a computer readable recording medium. For example, the encoding method according to an exemplary embodiment of the present inventive concept may be performed by executing a computer program including instructions for executing the encoding method stored in the computer readable recording medium. A computer, a processor, a workstation, etc., can execute the encoding methods described above.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The program codes for executing a method of upgrading an operation program in a Radio Frequency Identification (RFID) system may be transmitted in the form of carrier waves (such as data transmission through the Internet).

The computer readable recording medium can also be distributed over network coupled computer systems so that the computer readable code is stored and executed in a distributed fashion.

As described above, according to at least one embodiment of the present inventive concept, the mode decision performance of an encoder is increased. In addition, since the SKIP mode can be used, the quality of picture and the coding efficiency can be increased.

While the present inventive concept has been particularly shown and described with reference to exemplary embodiments thereof, it will be understood that various changes in forms and details may be made therein without departing from the spirit and scope of the disclosure.

What is claimed is:

1. An encoder comprising:
    a motion estimation module configured to perform motion estimation of a current frame based on at least one reference frame;
    a motion compensation module configured to generate a signal including a compensation image for the current frame from the at least one reference frame using a result of the motion estimation performed by the motion estimation module; and
    a coded block pattern (CBP) estimation module configured to estimate a CBP based on the signal output from the motion compensation module,
    wherein the signal output from the motion compensation module comprises a motion vector value from a current macroblock and a motion vector estimation value estimated from a macroblock adjacent the current macroblock
    wherein the CBP estimation module comprises:
        a transform unit configured to transform a difference between the motion vector value and the motion vector estimation value; and
        a quantization unit configured to quantize an output signal of the transform unit.

2. The encoder of claim 1, wherein when an output value of the quantization unit is 0, the CBP estimation module estimates a CBP value at 0 and determines an operating mode of the encoder to be an inter mode.

3. The encoder of claim 1, wherein the transform unit performs a Hadamard transform on the difference between the motion vector value and the motion vector estimation value.

4. The encoder of claim 3, further comprising:
    a mode selection module configured to convert an operation mode of the encoder to an intra mode; and
    an intra prediction module configured to perform intra prediction using blocks adjacent a current macroblock and perform compensation of an intra prediction result.

5. The encoder of claim 1, further comprising a frame storage module configured to store the at least one reference frame.

6. The encoder of claim 1, further comprising a differential module configured to generate and output a differential signal based on the current frame and an image output from the CBP estimation module.

7. The encoder of claim 6, further comprising:
    a transform module configured to perform a Hadamard transform on the differential signal output from the differential module; and
    a quantization module configured to perform quantization of an output signal of the transform module.

8. The encoder of claim 7, further comprising a reordering module configured to perform a zigzag scan on an output signal of the quantization module.

9. The encoder of claim 8, further comprising an entropy coding module configured to encode a signal output from the reordering module to output a coded bit stream.

10. An encoding method comprising:
    performing motion estimation of a current frame based on at least one reference frame;
    generating a signal including a compensation image for the current frame from the at least one reference frame using a result of the motion estimation; and
    estimating a coded block pattern (CBP) based on the signal,
    wherein the signal comprises a motion vector value from a current macroblock and a motion vector estimation value estimated from a macroblock adjacent the current macroblock
    wherein the estimating a coded block pattern (CBP) based on the signal comprises:
        transforming a difference between the motion vector value and the motion vector estimation value and outputting a transformed signal; and
        quantizing the transformed signal and outputting a quantized value.

11. The encoding method of claim 10, wherein estimating a coded block pattern (CBP) based on the signal further comprises:
    when the quantized value is 0, estimating a CBP value at 0 and determining an operating mode of the encoder to be an inter mode.

12. The encoding method of claim 10, wherein transforming a difference between the motion vector value and the motion vector estimation value and outputting a transformed signal comprises:
    performing a Hadamard transform on the difference between the motion vector value and the motion vector estimation value.

13. The encoding method of claim 10, further comprising generating and outputting a differential signal based on the current frame and an image output from the CBP estimation module.

14. The encoding method of claim 13, further comprising performing a Hadamard transform on the differential signal.

15. The encoding method of claim 14, further comprising performing quantization of the Hadamard transformed signal.

16. The encoding method claim 15, further comprising performing a zigzag scan on the quantized signal.

17. The encoding method of claim 16, further comprising encoding the zigzag scanned signal to output a coded bit stream.

* * * * *